A. SIDWELL.
EMERGENCY REPAIR LINK.
APPLICATION FILED JAN. 8, 1912.
1,047,580. Patented Dec. 17, 1912.
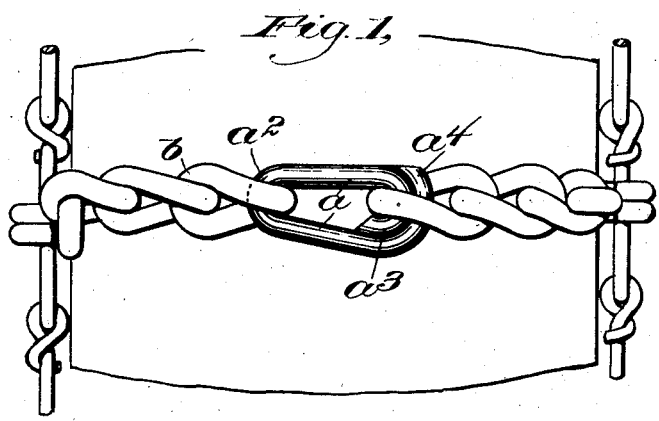
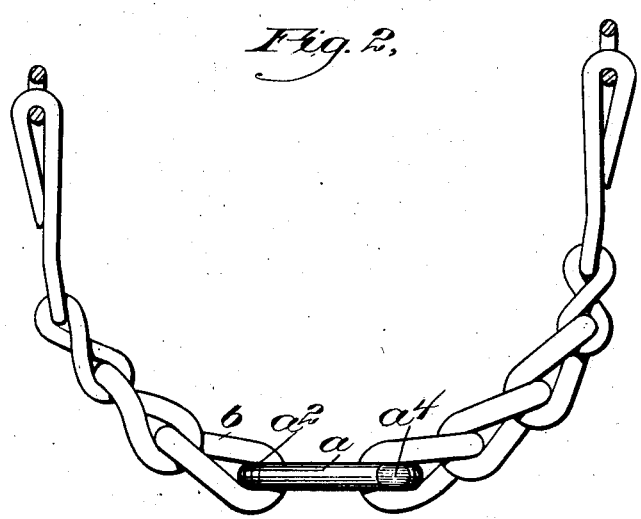
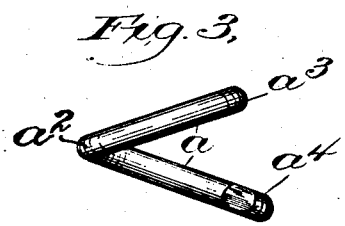
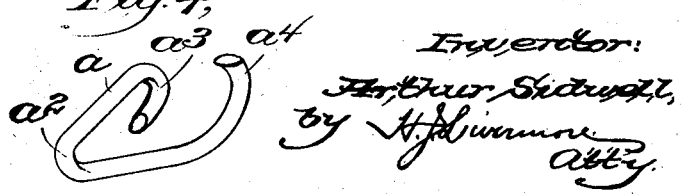

UNITED STATES PATENT OFFICE.

ARTHUR SIDWELL, OF WALTHAM, MASSACHUSETTS.

EMERGENCY REPAIR-LINK.

1,047,580. Specification of Letters Patent. Patented Dec. 17, 1912.

Application filed January 8, 1912. Serial No. 669,962.

*To all whom it may concern:*

Be it known that I, ARTHUR SIDWELL, a citizen of the United States, residing in Waltham, in the county of Middlesex and State of Massachusetts, have invented an Improvement in Emergency Repair-Links, of which the following description, in connection with the accompanying drawings, is a specification, like letters on the drawings representing like parts.

The present invention relates to an emergency repair link to be used in repairing broken cross links of the anti-skid chain sets now commonly used in connection with automobile wheels.

The cross chains wear out rapidly, and when a link finally wears through and drops out, the remaining links hang loosely from the opposite side chains, and will swing far enough away from the peripheries of the wheels to hit the mud guards; so that, although the loss of a chain is not particularly detrimental in itself, the noise is objectionable, and it is desirable, therefore, to remove the loose ends as soon as possible, whether a new chain is substituted or not. As the cross chains are commonly fastened to the side chains by means of hooks which can only be pried open with some difficulty, the removal of a chain causes some trouble, and takes time. Furthermore, while the loss of a single cross-chain makes no material difference, as previously stated, the anti-skid device is rendered somewhat less efficient by such loss, and the only remedy is the application of a new chain.

The repair link embodying the invention is intended to be substituted for the broken link, and is made so that it can be readily attached to the loose ends of the chain, so that the broken chain does not have to be removed from the side chains, and is rendered capable of effectual use, as before. Furthermore, the link is so constructed that it can be attached with very little trouble, a pair of pliers being the only tool required to complete the repair.

Figure 1 is a view, looking toward the periphery of the wheel, showing the side chains and one cross chain having the repair link applied thereto; Fig. 2 is a view of the cross chain as it appears when looking along the periphery of a wheel; Fig. 3 is a side view of the repair link as it is supplied to the user; and Fig. 4 is a perspective view of the same.

The link embodying the invention consists of a single wire $a$ of suitable material, such as steel, the wire being bent at $a^2$ to form a loop corresponding to the closed end of one of the ordinary chain links $b$. The two sides of the loop are spread laterally apart with relation to the plane of the loop, as shown in Figs. 3 and 4, and are provided, respectively, with curved or hooked ends $a^3$ and $a^4$, the side which has the end $a^4$ being longer than the side which has the end $a^3$, so that the hook $a^3$ will fit within the hook $a^4$ when the two sides are brought together and the hook $a^4$ extends entirely along the outer side of the hook $a^3$, as shown in Figs. 1 and 2, so that when the link is applied to a broken chain a link of said chain will engage only the hook $a^3$ of the repair link.

To repair a broken chain, the end links of the two parts of the chain are inserted in the loop, and over one of the hooks, the link at the hooked end then being drawn back into the loop far enough to allow the other hooked end to enter the link; and the two sides of the link are then pinched together with a pair of pliers or similar tool, thus converting the device into a closed link, as shown in Figs. 1 and 2. The link, when applied, has its hooked end $a^3$ only engaged by one of the links of the broken chain, and the hooked ends cannot spring open laterally, the two ends being held together by the permanent link of the chain; nor can the link be separated in the direction of the plane of the sides of the link, for the reason that the hooked ends are overlapped to such an extent as to be interlocked one with the other against separation in this direction, and the inner hook $a^3$ only engaging the link of the chain to which the repair link is connected. When once in place the repair link is substantially as strong and efficient as one of the links originally used.

As the links near the middle of the cross chain wear out before the others, it is possible, by this repair expedient, to utilize a broken chain for some time after it would otherwise be of no use, since the loss of one link destroys the utility of the chain, although the remaining links may be in good condition. If desired, the broken ends of the chain can be reversed and the hooks for the side chains secured to the worn links, while the repair link can be used to fasten the unworn links together, the chain then being practically as good as new.

Claim.

A repair link for anti-skid chains, comprising a wire bent into the form of a loop, and having its sides spread laterally with relation to the plane of the loop, one side of the loop being longer than the other, and the ends of said sides bent to form hooks adapted to fit one within the other when brought together and interlocked against separation in the direction of the plane of the loop, the outer hook extending entirely along the outer side of the inner hook, said inner hook designed to engage the link of a chain to which the repair link is applied.

In testimony whereof, I have signed my name to this specification in the presence of two subscribing witnesses.

ARTHUR SIDWELL.

Witnesses:
  JAS. J. MALONEY,
  W. E. COVENTRY.